US012665336B2

(12) United States Patent
Schmitz

(10) Patent No.: US 12,665,336 B2
(45) Date of Patent: Jun. 23, 2026

(54) ROW OF PLUG CONNECTORS

(71) Applicant: Weidmüller Interface GmbH & Co. KG, Detmold (DE)

(72) Inventor: Till Schmitz, Detmold (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 378 days.

(21) Appl. No.: 18/355,200

(22) Filed: Jul. 19, 2023

(65) Prior Publication Data

US 2024/0030640 A1 Jan. 25, 2024

(30) Foreign Application Priority Data

Jul. 19, 2022 (DE) ..................... 10 2022 118 017.4

(51) Int. Cl.
*H01R 13/193* (2006.01)
*H01R 4/48* (2006.01)
*H01R 13/514* (2006.01)

(52) U.S. Cl.
CPC .......... *H01R 13/193* (2013.01); *H01R 4/483* (2023.08); *H01R 13/514* (2013.01)

(58) Field of Classification Search
CPC .. H01R 4/4837; H01R 13/193; H01R 4/4828; H01R 4/483; H01R 4/484; H01R 4/4842; H01R 4/4844; H01R 4/48455
See application file for complete search history.

(56) References Cited

FOREIGN PATENT DOCUMENTS

| | | | | | |
|---|---|---|---|---|---|
| DE | 102015118032 | B4 * | 11/2017 | ............. | H01R 4/483 |
| EP | 0 984 513 | A2 | 6/1999 | | |
| EP | 1463152 | A1 * | 9/2004 | ........... | H01R 4/2412 |

* cited by examiner

*Primary Examiner* — Renee S Luebke
*Assistant Examiner* — Paul D Baillargeon
(74) *Attorney, Agent, or Firm* — Laubscher & Fretwell, P.C.

(57) ABSTRACT

A row of plug connectors for contacting a mating plug connector, each plug connector having a plate-like housing which can be joined on and which is made of an electrically non-conductive material, the housing having at least one insertion opening for a conductor end, the insertion opening being in connection with a housing chamber and the housing chamber having a connection device to which an actuation device is assigned, the respective actuation device being movably guided on or in guide contours, the guide contours being formed to movably guide the respective actuation device on and/or in two adjacent housings of two adjacent plug connectors.

14 Claims, 6 Drawing Sheets

ROW OF PLUG CONNECTORS

This application claims priority of DE 10 2022 118 017.4 filed on Jul. 19, 2022, the entire content of which is incorporated herein by reference.

BACKGROUND OF THE INVENTION

The invention relates to a row of plug connectors contacting a mating plug connector.

A wide variety of such rows of plug connectors are known from the prior art. In this application, the term "row of plug connectors" includes a higher-level multipanel plug connector which can be connected with a corresponding mating plug connector. The multipanel plug connector has a number of plug connector panels—also hereafter called "plug connectors"—which are joined together and mechanically connected together directly with mechanical connecting arrangements into a rail shape.

According to EP 0 984 513 A2, a plug connector has an insulating panel-like plastic housing with at least two connection devices for incoming electrical cables and at least two pin or socket contacts, which are each connected to the connection devices and can be connected with the mating plug connector.

The plastic housing of the plug connector has, counter to the joining-on direction, a housing wall, and has no housing wall in the joining-on direction, which means that it is open. The next plug connector is joined on here. The plastic housing of the final joined-on plug connector is closed in the joining-on direction by an end plate. This housing design is called a "panel design". The panel design is a design which saves construction space and material.

There is a need for the plug connector of EP 0 984 513 A2 to be further optimised with regard to the design of the individual plug connector panels.

SUMMARY OF THE INVENTION

It is an object of the present disclosure to provide a row of panel-like plug connectors for contacting a mating plug connector, each plug connector having a plate-like housing which can be joined on and which is made of an electrically non-conductive material, such as a plastic, and preferably has a front side and a rear side. Each housing has at least one insertion opening for a conductor end, the insertion opening is in connection with a housing chamber and the housing chamber has a connection device to which an actuation device is assigned. The actuation device is movably guided on or in guide contours which are formed to movably guide an actuation device on and/or in two adjacent housings of at least two or more adjacent plug connectors.

The use of two housings of adjacent plug connectors in a row for guiding produces a compact narrow structure of housings and respective plug connectors. In addition, the actuation devices are guided well.

In one embodiment, the sides that are joined also preferably assist in guiding the actuation devices. Protrusions perpendicular to the joining sides and recesses in the housings are preferably used as guiding contours.

In a separate embodiment, the actuation device actuates a contact limb of a contact spring of the connection device, for example to open and/or prestress it.

According to a further advantageous embodiment, the actuation device is formed as a pivoted lever or has a pivoted lever. However, alternatively, the respective actuation device is formed as a sliding element or has such a sliding element.

According to a further variant of the invention, the respective actuation device has a combination of a pivoted lever and a sliding element. The invention can be used advantageously in all these variants.

According to a further advantageous configuration, the pivoted lever has a shaft section at which it is rotatably mounted to directly or indirectly actuate the contact spring for contacting a conductor ends or the like. In order to achieve a narrow design in the joining-on direction, the respective shaft section is movably guided in a pivotable or rotatable manner in the guide contours of two adjacent housings. The guide contours of both housings together form a mounting ring which is preferably not circumferentially closed.

In another embodiment, the shaft section is in each case pivotably guided by one or more first ring-section-like guide contours of a "first" housing of a first plug connector, in which the pivoted lever can directly or indirectly move the metal structural component associated with it for connecting the conductor, in particular the springs of this metal structural component. From an adjacent second housing of an adjacent plug connector, one or more additional ring-like guide contours engage like protrusions in one or more corresponding recesses of the first housing in which the actuation device—in this case the pivoted lever—should be able to directly or indirectly move the metal structural component, in particular its spring, such that these additional guide contours are used to assist in guiding the actuation device in the respective first housing.

In an alternative embodiment, the shaft section includes a pivoted lever arm which projects from the shaft section—in particular in a substantially radial manner.

According to another embodiment, on the shaft section there is formed, substantially in the radial direction, an actuation protrusion which serves to open the contact spring.

According to yet another embodiment, the contact spring is formed substantially axially beside the shaft section to achieve a particularly compact configuration.

In addition, according to another embodiment, the respective insertion opening is arranged on the housing upper side of the housing.

In another embodiment, the respective connection device is designed in each case as a spring-loaded direct plug contact, which results in ease of implementation and a particularly simple toolless contacting of the conductor ends.

According to another embodiment of the invention, a first busbar section is lengthened downwards in the vertical direction and, jointly with a respective second busbar section, configures a plug contact, at which the plug connector can be contacted with a mating plug connector. As a result, through a function integration, a compactly constructed contact is created for connection to the mating plug connector.

In a further embodiment of the invention, a row of plug connectors is terminated by a cover plate which, in the first joining-on direction, covers the first housing chamber, and which, in the second joining-on direction, covers the second housing chamber, resulting in a structurally simple and therefore advantageous closure of the housing.

In an alternative embodiment, the housing of the plug connector (panels) has at least two insertion openings for conductor ends. The first insertion opening is in connection with a first housing chamber and the second insertion opening is in connection with a second housing chamber. The first housing chamber has a first connection device and the second housing chamber has a second connection device. Further, the housing has a first housing half and a second housing half, wherein, rotated in a point of symmetry or an axis of symmetry, the first housing half is reproduced on the second housing half, such that the housing is formed substantially or entirely in a rotationally symmetrical manner with regard to the point of symmetry or an axis of symmetry on which the point of symmetry is situated.

In this way, there is made available a plug connector with optimised clearances and creepage, during the manufacturing of which it is also possible to be able to employ many identical parts. This is because the housing chambers and the connection devices arranged therein are arranged far distant from one another on opposite sides of the housing in the two housing halves which are turned to one another to ensure large, or optimised, clearances and creepage. In addition, the connection devices can be produced on both sides from identical parts and do not have to be formed symmetrically in two versions for the left and right housing halves (which are open toward the same side—according to the prior art). Furthermore, the joining of other plug connectors, starting from a first plug connector, is possible in a particularly simple manner in two different joining directions, as a result of which the plug connector is advantageously flexible in use. It is particularly advantageous if the two housing halves are oriented to one another, turned by 180°, and are preferably integrally connected to one another. These options are advantageous within the context of the present invention, but it is not mandatory to provide it.

BRIEF DESCRIPTION OF THE DRAWINGS

The invention is described in greater detail hereafter with reference to the drawings by means of exemplary embodiments, wherein further advantageous variants and configurations are also discussed. It should be emphasised that the exemplary embodiment discussed hereafter are not meant to describe the invention exclusively but rather, on the contrary, variants and equivalents which are not depicted are also considered. In the drawings.

DETAILED DESCRIPTION

Figure 1A:
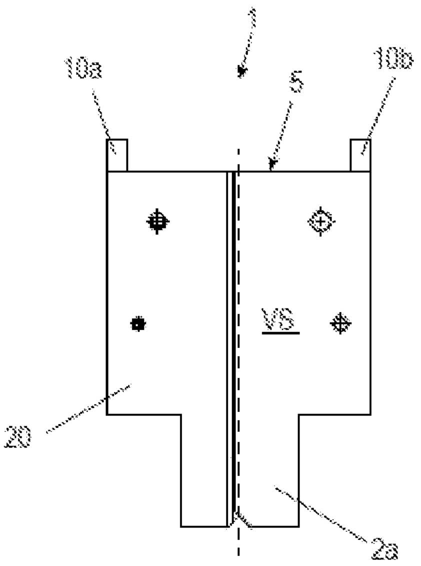
FIG. 1*a* is a front view of an exemplary embodiment of a multipanel plug connector.

The terms used hereafter such as “vertical”, “perpendicular”, “horizontal”, “top”, “bottom”, “right”, “left” relate to the respective drawing. A spatial coordinate system in each drawing can be used for additional orientation.

FIGS. 1*a*-1*f* show a substantially panel-like plug connector 1 which can be plugged together with a mating plug connector, with the mating plug connector (not depicted here) also able to be formed as a section of a series terminal or as a section of an electrical appliance. The mating plug connector may be able to be joined onto a mounting rail or a circuit board or the like. The respective plug connector 1 can be joined together with further plug connectors 1 of an identical or substantially identical design, so that there then arises a higher-level multipanel plug connector 100 made up of a number of plug connector panels 1 joined together. Hereafter, the respective plug connector panel 1 is synonymously also named a “plug connector” for short.

The multipanel plug connector 1 from FIGS. 1*a*-1*f* can have a substantially or precisely rotationally symmetrical housing 2. This is advantageous, but not mandatory. FIGS. 2*a*-2*b* shows a different variant in which this is not the case.

The respective housing is preferably made of an electrically non-conductive material, such as plastic.

Here, the term “rotationally symmetrical” means that the housing 2 is mirrored at only one single point of symmetry S, and in doing so reproduces itself.

Figure 1B:
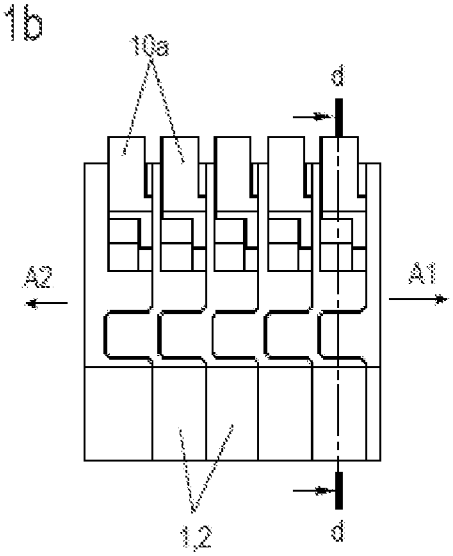
FIG. 1*b* is a side view of the plug connector of FIG. 1*a;*
Figure 1C:
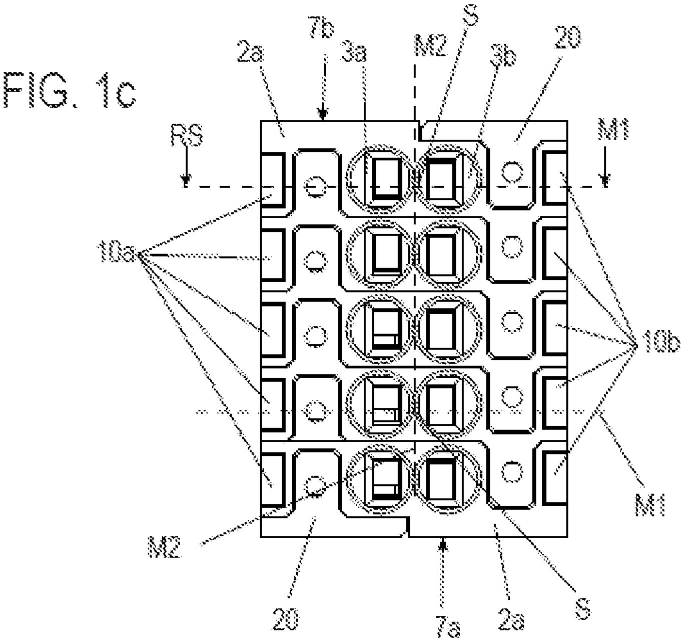
FIG. 1*c* is a top view of the plug connector from FIG. 1*a;*
Figure 2A:
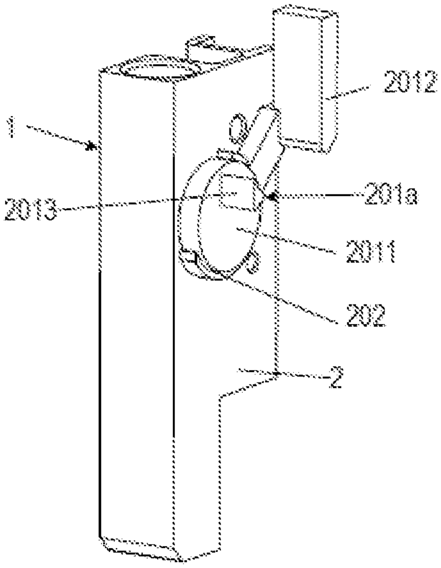
FIG. 2*a* is a perspective view of another couplable plug connector panel.
Figure 2B:
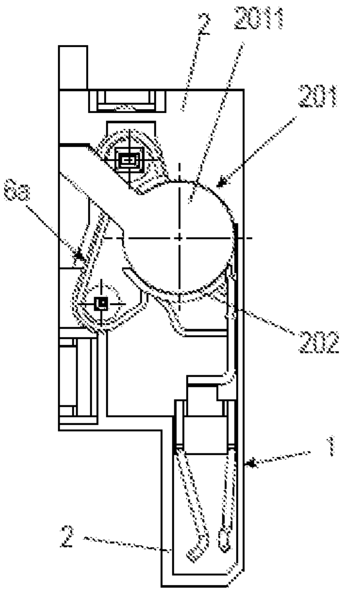
FIG. 2*b* is a cross-sectional view of the plug connector panel of FIG. 2*a* when joined with another plug connector panel.

In FIG. 1*c*, the point of symmetry S is situated on an imaginary point of intersection of two center lines M1, M2, which respectively bisect the length L and the width B with regard to a housing upper side 5—with regard to the coordinate system in FIGS. 1*a*, 1*b*, 1*c* parallel to an x-y plane—of the housing 2. This applies to any plane parallel to the x-y plane with regard to the entire housing 2, such that there arises parallel to the z-axis an imaginary axis of symmetry through the points of symmetry S on these planes.

In other words, if a first housing half 8*a*, in the point of symmetry or axis of symmetry perpendicular to M1 and M2 through S, is theoretically rotated by 180° in the clockwise direction, this first housing half 8*a* is reproduced on a second housing half 8*b*. In this regard, the housing 2, like the first housing half 8*a* and the second housing half 8*b*, can also be referred to as inversion-symmetrical or rotationally symmetrical with regard to the point of symmetry S.

The respective plug connector 1 preferably links at least two conductor ends (not shown here) and connects them respectively to a plug contact in a conductive manner. However, it can be formed such that only one conductor end or more than two conductor ends can be linked to it.

For this purpose, the housing 2 has at least two, and here precisely two, insertion openings 3*a*, 3*b* for respective conductor ends (see e.g. FIG. 1*c*). The first insertion opening 3*a* and the second insertion opening 3*b* are arranged here on the housing upper side 5. They could also be arranged at an angle or laterally. The respective insertion opening 3*a*, 3*b* extends into a first housing chamber 4*a* and a second housing chamber 4*b*.

Figure 1D:
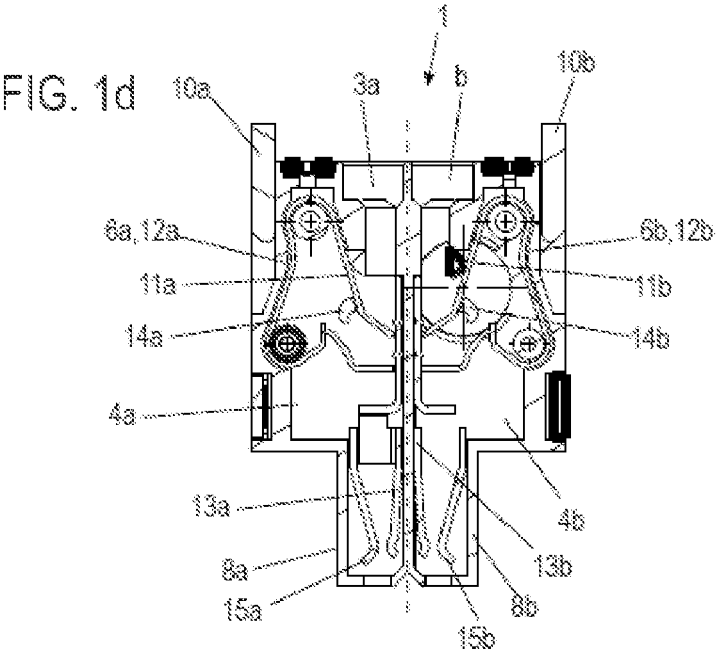
FIG. 1*d* is a cross-sectional front view of a plug connector panel of the plug connector from FIG. 1*a;*
Figure 1E:
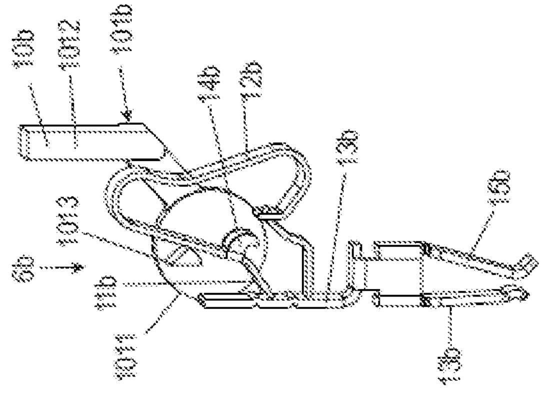
FIG. 1*e* is a perspective view of an actuation device for a connection device for conductors in a position in which the actuation device is in a home position and the connection device is contacting a conductor.
Figure 1F:
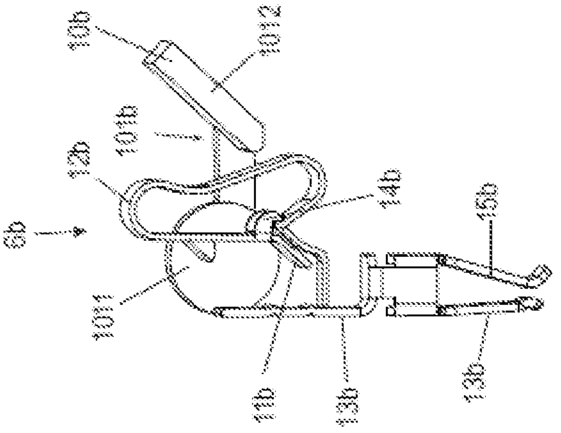
FIG. 1*f* is a perspective view of the actuation device of FIG. 1*e* in a position in which the connection device is prestressed by the actuation device.
Figure 1G:
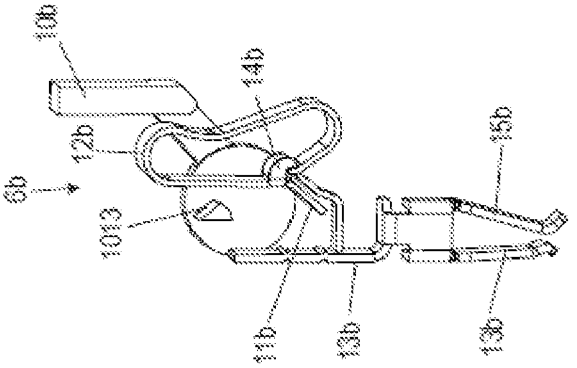
FIG. 1*g* is a perspective view of the actuation device of FIG. 1*e* in a position in which the connection device is prestressed and the actuation device is in the home position.
Figure 1H:
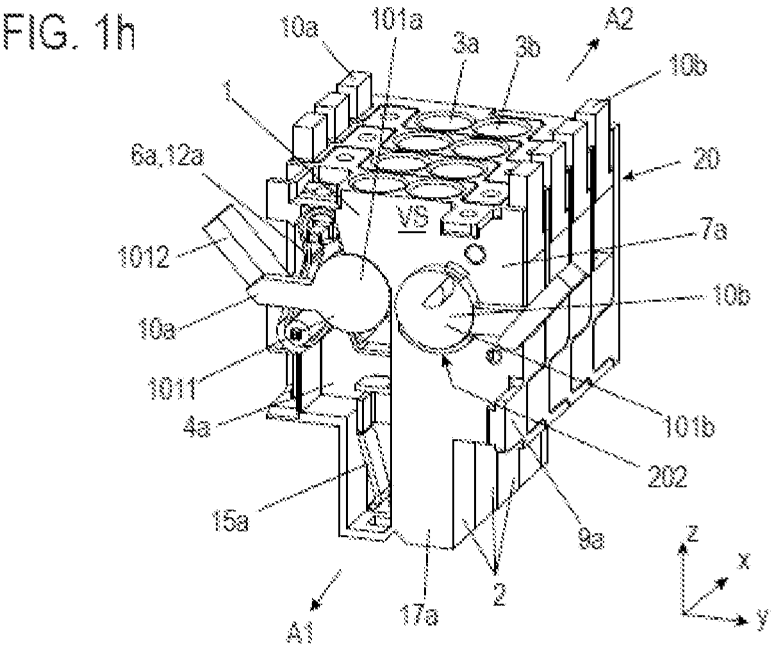
FIG. 1*h* is a perspective view of plug connector panels from FIG. 1*a* which are joined together and wherein the connection device is prestressed by the actuation device.
Figure 1I:
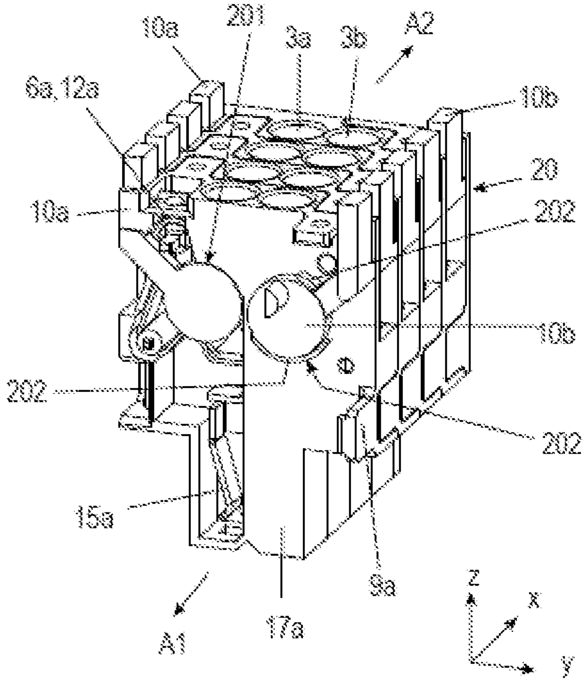
FIG. 1*i* is a perspective view of plug connector panels from FIG. 1*a* which are joined together and wherein the connection device is prestressed by the actuation device and the actuation device is in the home position.

The first housing chamber 4*a* here substantially occupies the first housing half 8*a* and the second housing chamber 4*b* substantially occupies the second housing half 8*b* (see FIGS. 1*d* and 1*h*).

The first housing chamber 4*a* has a first connection device 6*a* and the second housing chamber 4*b* has a second connection device 6*b*. The connection devices 6*a*, 6*b* are arranged here in the respective housing chamber 4*a*, 4*b* in a mirror-symmetrical or rotationally symmetrical manner relative to one another.

The housing 2 of the respective plug connector panel 1 has, on its front side VS a first housing wall 7*a* that closes the second housing chamber 4*b*, which is arranged on the right in FIG. 1*a*. In contrast, the first housing chamber 4*a*, which in FIG. 1*a* is arranged on the left on the front side VS of the housing 2, is open such that the first connection device 6*a* is visible (shown in FIG. 1*h*). The first housing chamber 4*a* is thus outwardly open on the front side VS of the housing 2.

The housing chambers 4*a*, 4*b* and the connection devices arranged therein and overall the two metal structural components are thus arranged far distant from one another on opposite sides of the housing in the two housing halves which are turned relative to one another, which ensures large, or optimised, clearances and creepage distances.

The housing 2 of the plug connector panel 1 has, on its rear side RS (shown in FIG. 1*c*) a second housing wall 7*b* which likewise closes only one of the two housing chambers, namely the first housing chamber 4*a*. The first housing chamber 4*a*, arranged to the right in the direction of view onto the rear side RS of the housing 2, is arranged in one housing half. In contrast, the second housing chamber 4*b*, which is arranged to the left in the direction of view onto the rear side RS, is open. The second housing chamber 4*b* is thus outwardly open on the rear side RS of the housing 2 and is arranged in the other housing half.

The first housing chamber 4*a* on the front side VS of the housing 2, shown to to the left in FIGS. 1*d* and 1*h*, is closed, in that a second, geometrically identical plug connector 1' is joined on with its housing 2 on the front side VS of the plug connector 1, which is already joined on, in a first joining-on direction A1 (i.e. in a negative x-direction with regard to the coordinate system in FIG. 1*h* onto the housing 2 of the first plug connector 1 depicted in FIG. 1*h*).

Analogously to this, the second housing chamber 4*b* is closed on the rear side RS of the housing 2, in that a third, geometrically identical plug connector 1" is joined on with its housing 2 on the rear side RS of the first plug connector 1, which is already joined on, in a second joining-on direction A2 (i.e. in a positive x-direction with regard to the coordinate system in FIG. 1*h*, onto the housing 2 of the first plug connector 1 depicted in FIG. 1*a*).

Through the housing 2, which is open over half the side, both on the front side VS and on the rear side RS of the housing 2, the plug connector 1 according to FIGS. 1*a*-1*f* and 1*h* can advantageously be joined together in two different joining-on directions A1, A2.

The first joining-on direction A1 extends in the negative x-direction with regard to the coordinate system in FIG. 1*h*. The second joining-on direction A2 extends in the positive x-direction with regard to the coordinate system in FIG. 1*h*. There arises a flexible, simple assembly and a high degree of use of identical parts since the geometrically identical housing 2 is always able to be used, irrespective of the joining-on direction A1, A2 in which the next plug connector 1 is intended to be joined on.

In order for plug connectors 1, 1', 1" to be joined on in the correct orientation, the housing 2 has in each case form-fitting elements 21*a*, 21*b* which also serve as joining aids. The form-fitting elements 21*a*, 21*b* are formed such that form-fitting elements of adjacent housings or plug connectors, in a row of plug connectors 1, 1', 1", respectively as a pin and recess, substantially engage one another in a substantially form-fitting manner. The plug connectors 1, 1', 1" cannot be incorrectly constructed without a gap between the housings 2, 2, 2. In this manner, the form-fitting elements 21*a*, 21*b* prevent the plug connectors 1, 1', 1" from being joined together in the wrong way and make the row secure.

In order to connect the joined-together plug connectors 1, 1', 1", or their housings 2, 2, 2, to one another, the respective housing 2, 2, 2 furthermore has a first locking arrangement 9*a* and a second locking arrangement 9*b*.

Here, the first locking arrangement 9*a* is arranged to the right on the front side VS of the housing 2 in FIG. 1*a* and is likewise arranged to the right on the rear side RS in the direction of view onto the rear side RS of the housing 2. The second locking arrangement 9*b* or mating locking arrangement (not depicted here) is thus located to the left on the front side VS of the housing 2 and likewise to the left on the rear side RS in the direction of view onto the rear side RS of the housing 2; see also in this regard FIG. 1*b* and FIG. 1*c*. The first locking arrangement 9*a* can, for example, be designed as locking hooks and the mating locking arrangement can be designed as latches.

The two connection devices 6*a*, 6*b*—also referred to as a metal structural component—are designed here in each case as pressure-spring connections and as direct plug-in connections. The design of the connection devices 6*a*, 6*b* as a pressure-spring connection is advantageous because it makes it possible to accomplish contacting and releasing without a tool, but it is not mandatory. Alternatively, other connection types are possible, such as connections in tension spring technology, screw connections, in particular tension spring connections or insulation-penetrating connections. Furthermore, a number of conductor connections per housing 2 can also be used.

According to the invention, plug connectors 1 can have only a single connection device 6*a* which is formed in a housing 2. Such a configuration is depicted in FIGS. 2*a* and 2*b*. In addition, other variants include a number of the connection devices 6*a*, 6*b* that are accessible from a common side of the housing 2 (not depicted here).

The respective connection device 6*a*, 6*b* furthermore has one actuation device 10*a*, 10*b*. This can be provided to prestress a contact limb 11*a*, 11*b* of a contact spring 12*a*, 12*b* of the connection device 6*a*, 6*b*. It can be made of metal and/or non-metal materials.

The respective actuation device 10*a*, 10*b* is movably guided on or in guide contours 201, 201. These guide contours 201, 202 for movably guiding a respective actuation device 10*a*, 10*b* are respectively formed in two adjacent housings 2, 2.

This means that the respective actuation device 10*a*, 10*b*, on the one hand, is movably guided in each case by one or more first guide contours 201 of the respective first housing 2, in which it directly or indirectly moves the metal structural component, in particular its spring.

Additionally, at least from a respective adjacent, second housing 2 of an adjacent plug connector 1, one or more additional guide contours 202 engage like protrusions in the respective first housing 2, in which the actuation device 10*a*, 10*b* directly or indirectly moves the metal structural component, in particular its spring. These additional guide contours 202 are used to assist in guiding the actuation device 10*a* or 10*b* in the respective first housing 2 and complete the guiding function.

In this manner, two housings 2, 2 of adjacent plug connectors are used in a row to guide, which contributes to a compact structure of the respective housing 2 and of the respective plug connectors 1 in the joining-on direction and counter to the joining-on direction. In addition, a very good guiding of the actuation device is also guaranteed at locations at which, in certain circumstances, otherwise no guide contours can be provided in the first housing 2.

According to the figures from FIGS. 1 and 2, the actuation device 10*a*, 10*b* has in each case a pivoted lever 101*a*, 101*b*, which is pivotably mounted.

The pivoted lever 101*a*, 101*b* can act directly on a contact spring 12*a*, 12*b*, assigned to it, directly via an actuation protrusion 1013 or the like, or indirectly, e.g. via a sliding element. It is also possible for only a sliding element to be provided as the actuation device.

The contact spring 12*a*, 12*b* can optionally be prestressed into an open position and be locked in it. It is releasable by a conductor which is introduced into the housing 2, releases the prestressing and is then contacted.

The pivoted lever 101*a*, 101*b* can have a shaft section 1011, at which it is rotatably mounted in the housing 2 whose contact spring 12*a* or 12*b* it is meant to actuate.

On the shaft section 1011 there can be formed a pivoted lever arm 1012 which can project from the shaft section 1011—e.g. in a substantially radial manner. On the shaft section 1012 there can be formed, e.g. substantially in the radial direction, an actuation protrusion 1013 which serves to open the contact spring 12*a*, 12*b*. The contact spring 12*a* can then be formed substantially axially beside the shaft section 1011.

The respective shaft section 1011 is movably guided in a pivotably or rotatable manner in guide contours 201, 201. These guide contours 201, 202 together form a mounting ring, which is preferably not circumferentially closed. The guide contours 201, 202 are respectively formed in two adjacent housings 2, 2.

In this regard, FIG. 2*a* shows a couplable plug connector panel 1 or plug connector 1. FIG. 2*b* is a cross-section through the plug connector from FIG. 2*a* in the joined-together state with an additional plug connector 1. The pivoted lever 101 can also in each case be premounted on the second plug connector panel 1 and is then placed into the housing 2 when the plug connector panels 1 are joined together, in that it serves to actuate an element of the connection device.

As can be seen particularly well in the cross-section from FIG. 2*b*, the respective shaft section 1011 of the pivoted lever 101 is movably guided or pivotably supported by one or more first ring-section-like guide contours 201 of the respective first housing 2, in which the pivoted lever 101*a* can directly or indirectly move the metal structural component associated with it for connecting the conductor, in particular its spring. Additionally, at least from a respective adjacent second housing 2 of an adjacent plug connector 1, one or more additional ring-like guide contours 202 engage like protrusions in corresponding recesses of the respective first housing 2, in which the actuation device 10*a*, 10*b*—in this case the respective pivoted lever 101*a*, 101*b*—is intended to directly or indirectly move the metal structural component, in particular its spring. These additional guide contours 202 are used to assist in guiding the actuation device 10*a* or 10*b* in the respective first housing 2.

Precisely to guide a shaft section 1011, in particular a panel-like shaft section of relatively large diameter which can also have an actuation protrusion 1013 for opening the contact clamp spring 12*a*, 12*b*, preferably two or more housings 2, 2 of adjacent plug connectors in a row are used to guide the respective actuation device, such that a relatively largely circumferentially closed "mounting ring" can be jointly formed from the guide contours 201, 202.

A contact is produced in the case of the connection devices from FIGS. 1 and 2 when respective (stripped) conductor ends are inserted into the respective insertion opening 3*a*, 3*b*. In this case, the clamping location is first opened and then prestressing of the contact spring 12*a*, 12*b* is released such that the contact limb 11*a*, 11*b* presses the respective conductor end against a first busbar section 13*a*, 13*b*. The contact can be released again by the actuation device, for instance by the pivoted lever 10 or a combination of a pivoted lever and a sliding element, in order to once again open and/or prestress the contact spring 12*a*, 12*b* to contact the conductor end (not depicted here). This is by way of example, but not mandatory. The direct plug-in connection could also be formed as a direct plug-in connection which can be locked in an open position.

The first busbar section 13*a*, 13*b* can be lengthened in each case downwards in the vertical direction—i.e. in the negative z-direction with regard to the coordinate system in FIG. 1*h*—and forms, together with a respective second busbar section 15*a*, in each case a plug contact, in this case a tulip contact or socket contact, by which the plug connector 1 can be plugged onto the mating plug connector. The plug contact can also be a contact blade or a pin contact. In addition, the mating plug connector accordingly has in each case a geometrically corresponding plug contact (not depicted here). The contact between the plug connector 1 and the mating plug connector can also be designed differently. For example, pin contacts or mixed forms with pin and tulip contacts and/or shield contacts are also conceivable.

To terminate a row of plug connectors 1, a cover plate 20 is provided (see FIGS. 1*a* and 1*k*), which, in the first joining-on direction A1, covers the first housing chamber 4*a* arranged to the left on the front side VS of the housing 2 and, in the second joining-on direction A2 in the direction of view onto the rear side RS, covers the second housing chamber 4*b*.

In this way, a multipanel plug connector is made available which makes it possible to join on additional plug connectors 1', 1" in two joining-on directions and accordingly is flexible in use. Furthermore, the conductor connection takes place from the housing upper side 5 (see in particular FIG. 1*c* and FIGS. 1*d*-1*f*), such that the conductor connection is spatially separated from the actuation device 10*a*, 10*b* for the respective connection device 6*a*, 6*b*, which is also advantageous. Furthermore, the two connection devices 6*a*, 6*b* are in each case oriented to an outer narrow side 16*a*, 16*b* of the housing 2, as a result of which the danger of undesired electrical shunts is advantageously reduced.

Before the housing wall 7*a*, 7*b*, each respective housing can have a planar thickening 17*a*, 17*b* of the housing wall. The thickening 17*a*, 17*b* of the housing wall thickens the respective housing wall 7*a*, 7*b* which is increased in the respective joining-on direction A1 and A2.

The geometry of the thickening 17*a*, 17*b* of the housing wall can be formed like a protrusion such that it fits in a substantially form-fitting manner into a respective corresponding opening or recess of the adjacent housing 2.

The pivoted lever of the actuation device 10*a'*, 10*b'* can be formed to be angled outwards.

Figure 1J:
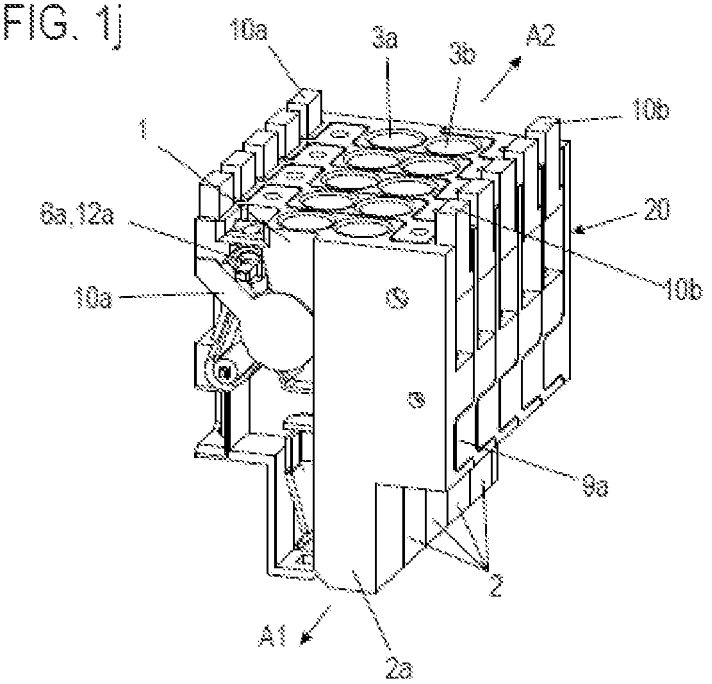
FIG. 1*j* is a perspective view of plug connector panels according to FIG. 1*i* with one housing end plate.
Figure 1K:
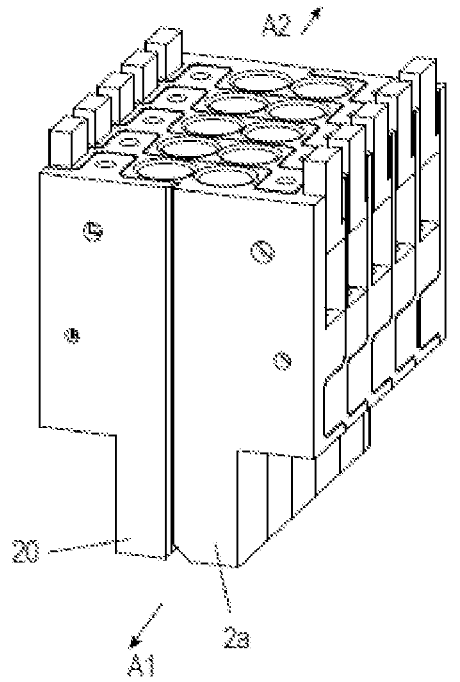
FIG. 1*k* is a perspective view of plug connector panels according to FIG. 1*i* with two housing end plates.

A separate housing end 2*a* can be provided as a termination of joined-on plug connectors 1, as is depicted in FIG. 1*j*. The housing chamber 4*a* which is open at the housing end 2*a* is closed with an additional cover cap 20, as is depicted in FIG. 1*a*-1*c* and in FIG. 1*k*.

FIG. 1*e* depicts the actuation device 10*a*, 10*b* with the connection device 6*a*, 6*b* in a position in which the actuation device 10*a*, 10*b* is in a home position and the connection device 6*a*, 6*b* could contact a conductor. FIG. 1*f* depicts the actuation device 10*a*, 10*b* in a position in which the connection device 6*a*, 6*b* is prestressed in an open position by the actuation device 10*a*, 10*b*. FIG. 1*g* depicts the actuation device 10*a*, 10*b* in a position in which the connection device 6*a*, 6*b* is prestressed and the actuation device 10*a*, 10*b* is in the home position.

What is claimed is:

1. A row of plug connectors for contacting a mating plug connector, the plug connectors comprising a plate-shaped housing for joining connectors together which is made of an electrically non-conductive material, the housing having at least one insertion opening for a conductor end, the insertion opening being in connection with a housing chamber and the housing chamber having a connection device to which an actuation device is assigned, the actuation device being movably guided by one or more guide contours of its housing and one or more additional guide contours of at least one adjacent housing, the one or more additional guide contours being configured to engage one or more protrusions in a corresponding recess, wherein the guide contours guide the actuation device to actuate the connection device.

2. The row of plug connectors according to claim 1, wherein the actuation device actuates a contact limb of a contact spring of the connection device.

3. The row of plug connectors according to claim 2, wherein the actuation device includes a pivoted lever having a shaft section at which it is rotatably mounted to actuate the contact spring.

4. The row of plug connectors according to claim 3, wherein the shaft section is movably guided in a pivotable or rotatable manner by the guide contours of housings of two adjacent plug connectors, the guide contours of the housings together forming a mounting ring.

5. The row of plug connectors according to claim 3, wherein the shaft section includes a pivoted lever arm which radially projects from the shaft section.

6. The row of plug connectors according to claim 3, wherein the shaft section includes an actuation protrusion to open the contact spring.

7. The row of plug connectors according to claim 3, wherein the contact spring is arranged substantially axially beside the shaft section.

8. The row of plug connectors according to claim 1, wherein the actuation device includes a pivoted lever.

9. The row of plug connectors according to claim 8, wherein the pivoted lever of the actuation device is angled outward and extends out from the housing.

10. The row of plug connectors according to claim 1, wherein the actuation device includes a sliding element.

11. The row of plug connectors according to claim 10, wherein the actuation device further includes a pivoted lever.

12. The row of plug connectors according to claim 1, wherein the insertion opening is arranged on an upper side of the housing.

13. The row of plug connectors according to claim 1, wherein the connection device includes a spring-loaded direct plug contact.

14. The row of plug connectors according to claim 1, wherein the connection device includes a tension spring connection.

* * * * *